(12) United States Patent
Chao

(10) Patent No.: US 9,801,249 B2
(45) Date of Patent: Oct. 24, 2017

(54) CIRCUIT STRUCTURE FOR ADJUSTING LED COLOR TEMPERATURE CURVE

(71) Applicant: Wen Hsin Chao, Changhua County (TW)

(72) Inventor: Wen Hsin Chao, Changhua County (TW)

( * ) Notice: Subject to any disclaimer, the term of this patent is extended or adjusted under 35 U.S.C. 154(b) by 0 days.

(21) Appl. No.: 15/192,365

(22) Filed: Jun. 24, 2016

(65) Prior Publication Data

US 2017/0079107 A1 Mar. 16, 2017

(30) Foreign Application Priority Data

Sep. 15, 2015 (CN) ............... 2015 2 0710201 U

(51) Int. Cl.
H05B 37/02 (2006.01)
H05B 33/08 (2006.01)

(52) U.S. Cl.
CPC ....... *H05B 33/0857* (2013.01); *H05B 33/086* (2013.01); *H05B 33/0812* (2013.01); *H05B 33/0827* (2013.01)

(58) Field of Classification Search
CPC ............ H05B 33/0857; H05B 33/0812; H05B 33/0827; H05B 33/086
See application file for complete search history.

(56) References Cited

U.S. PATENT DOCUMENTS

| | | | |
|---|---|---|---|
| 2002/0048177 A1* | 4/2002 | Rahm ................. | H01L 25/0753 362/555 |
| 2002/0105763 A1* | 8/2002 | Yeh ....................... | A47H 5/0325 361/31 |
| 2010/0090604 A1* | 4/2010 | Maruyama ......... | H05B 33/0803 315/119 |
| 2010/0280922 A1* | 11/2010 | Giovannotto ...... | H05B 33/0857 705/26.5 |
| 2013/0175924 A1* | 7/2013 | Codutti .................... | B60Q 1/00 315/77 |
| 2014/0126261 A1* | 5/2014 | Newman, Jr. ......... | H02M 1/081 363/128 |
| 2015/0069918 A1* | 3/2015 | Trattler .............. | H05B 33/0872 315/151 |
| 2016/0299552 A1* | 10/2016 | Lin ..................... | G06F 3/03545 |

* cited by examiner

Primary Examiner — Tung X Le
Assistant Examiner — Raymond R Chai
(74) Attorney, Agent, or Firm — WPAT, P.C., Intellectual Property Attorneys; Anthony King

(57) ABSTRACT

A circuit structure for adjusting LED color temperature curve includes at least a first LED light set having plural first LED lights in series; at least a second LED light set connected with the first LED light set in parallel and having plural second LED lights in series; a current detection circuit having a first variable resistance and a first transistor; and a color temperature curve adjusting circuit having a resistance, a second variable resistance, and a second transistor, the resistance connected with the first transistor and the second transistor and the second variable resistance, an emitter of the second transistor connected with the input end of one first LED light. The current detection circuit and the color temperature curve adjusting circuit are used to accurately adjust the curve and the peak of the color temperature.

8 Claims, 3 Drawing Sheets

CIRCUIT STRUCTURE FOR ADJUSTING LED COLOR TEMPERATURE CURVE

BACKGROUND OF THE INVENTION

1. Field of the Invention

The present invention relates to LED light adjustment, and more particularly, to a circuit structure for adjusting LED color temperature.

2. Description of the Related Art

LED color temperature is shown by absolute temperature K, which is defined by heating a standard black object to a certain temperature, such that the color of the black object gradually turns from dark red to light red, orange, white, and blue. When the color of a light source is identical to the color of the black object which is heated to a certain temperature, the light source is defined as the light source of the absolute temperature of the black object.

Conventionally, a resistance is connected with the circuit in series for the LED light color adjustment. However, such manner hardly provides an accurate color temperature adjustment. Also, the color temperature curve is unable to be adjusted, and the initial point of the color temperature curve is unable to be moderated. As a result, the loss of power is relatively large.

Therefore, the industry needs to overcome the aforementioned issues, so as to improve the accuracy of the color temperature adjustment and adjust the color temperature curve, thereby lowering the loss of power and enhancing the adjustment accuracy.

SUMMARY OF THE INVENTION

For improving aforementioned issues, embodiments of the present invention disclose a circuit structure for adjusting LED color temperature curve, which is capable of adjusting the color temperature accurately and improving the relatively large power loss that are unable to be achieved by the conventional color temperature adjustment circuit.

For achieving the objectives, embodiments of the present invention provide a circuit structure for adjusting LED color temperature curve, comprising:

a power source provided with a positive pole and a negative pole;

at least a first LED light set provided with plural first LED lights connected in series;

at least a second LED light set connected with the first LED light set in parallel and provided with plural second LED lights connected in series;

a current detection circuit provided with a first variable resistance and a first transistor, one end of the first variable resistance connected with the positive pole of the power source and an emitter of the first transistor, the other end of the first variable resistance connected with a base of the first transistor, an input end of the at least one first LED light set, and an input end of the at least one second LED light set; and a color temperature curve adjusting circuit provided with a resistance, a second variable resistance, and a second transistor, one end of the resistance connected with a collector of the first transistor, the other end of the resistance connected with a base of the second transistor and one end of the second variable resistance, the other end of the second variable resistance connected with the negative pole of the power source, a collector of the second transistor, an output end of the at least one first LED light set, and an output end of the at least one second LED light set, wherein the emitter of the second transistor is connected with the input end of one of the first LED light.

With such configuration, by use of the current detection circuit and the color temperature curve adjusting circuit, embodiments provided by the present invention is able to adjust the color temperature curve and moderate the color temperature peak, such that the color temperature adjustment is more accurate. Also, circuit in the embodiments of the present invention is structurally simple, so as to lower the loss of power.

DETAILED DESCRIPTION OF THE INVENTION

The aforementioned and further advantages and features of the present invention will be understood by reference to the description of the preferred embodiment in conjunction with the accompanying drawings where the components are illustrated based on a proportion for explanation but not subject to the actual component proportion.

Figure 1:
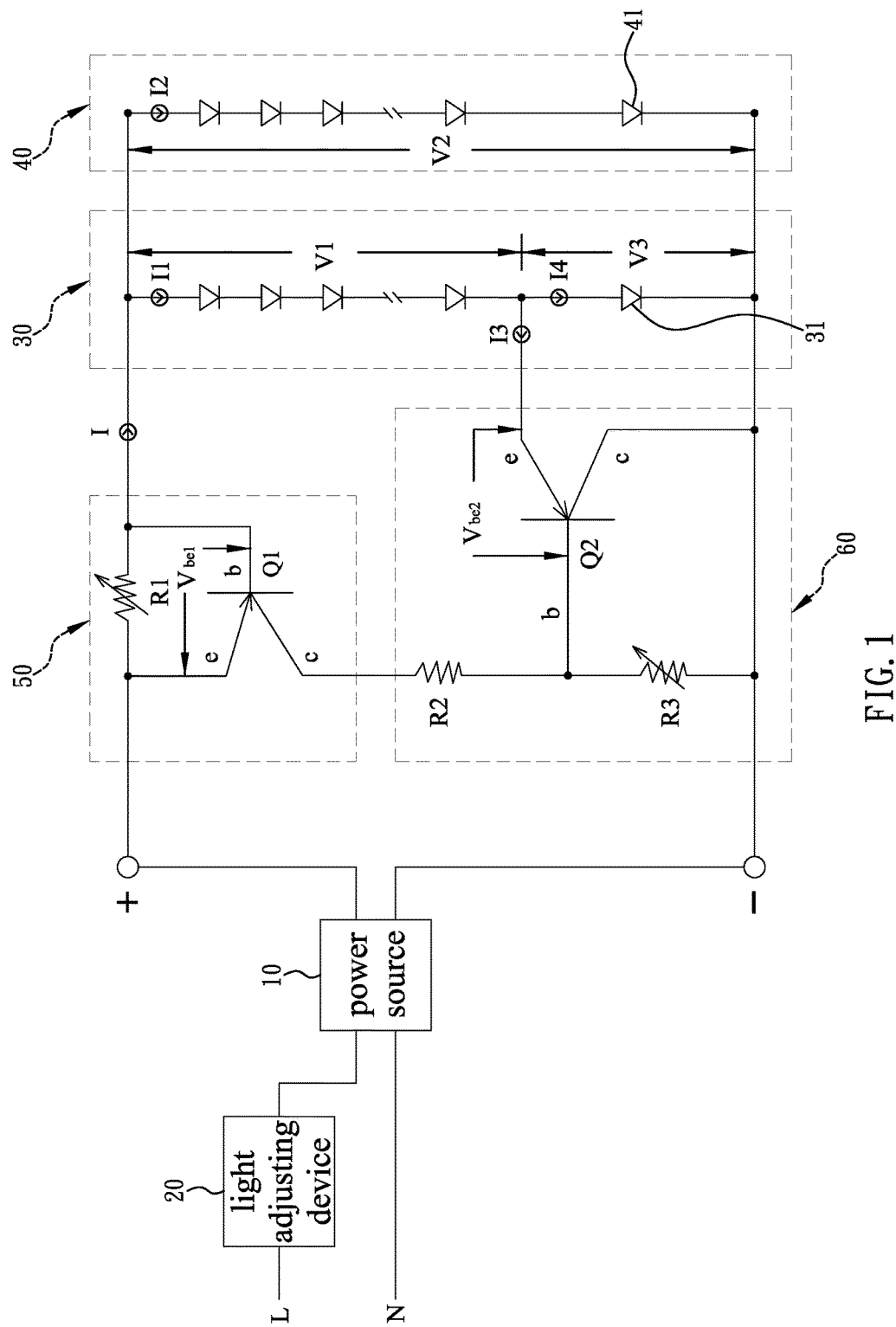
FIG. 1 is a schematic view illustrating the structure in accordance of an embodiment of the present invention.
Figure 2:
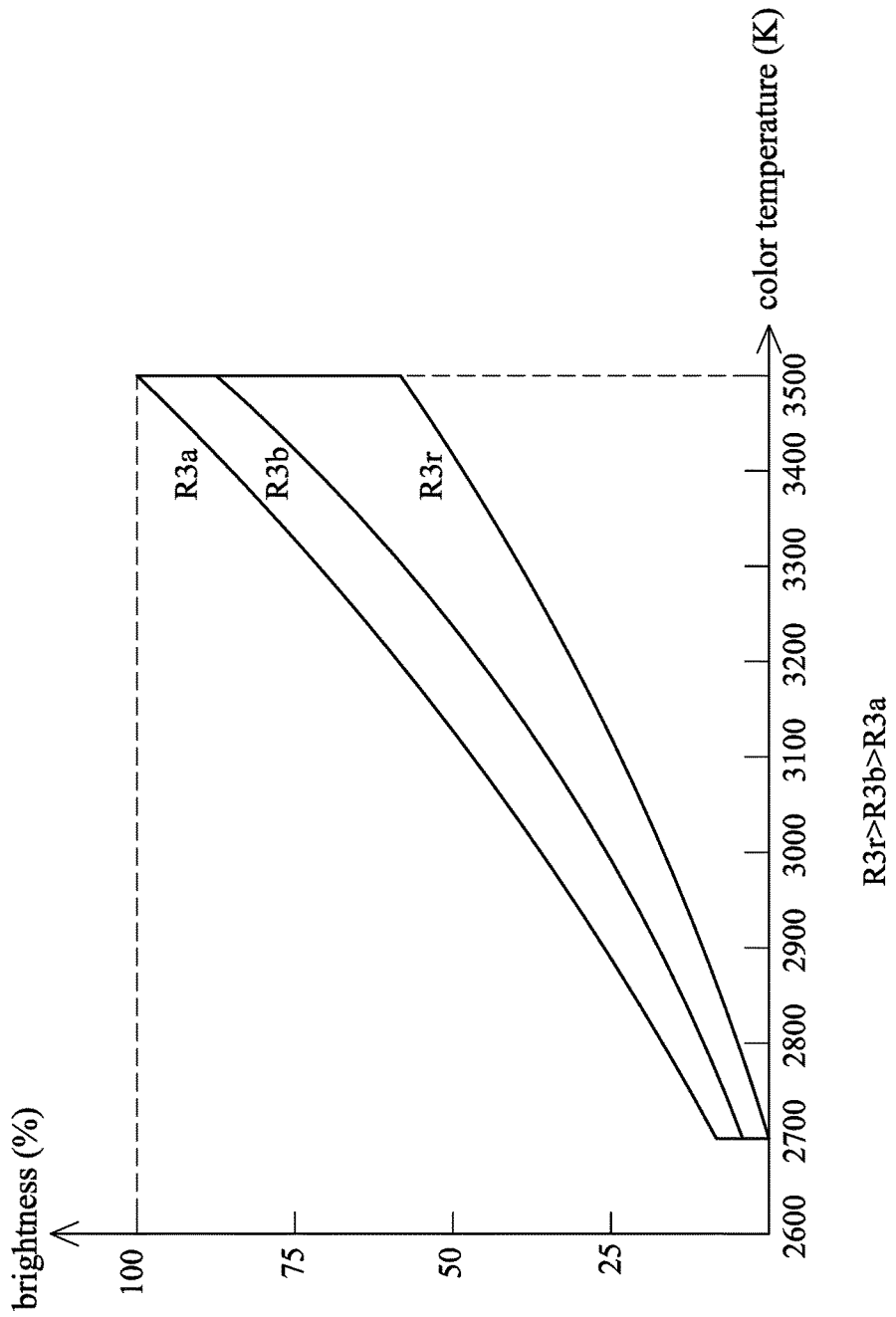
FIG. 2 is a schematic view illustrating the curve variation of the adjustable resistance R3 in accordance with the embodiment of the present invention.
Figure 3:
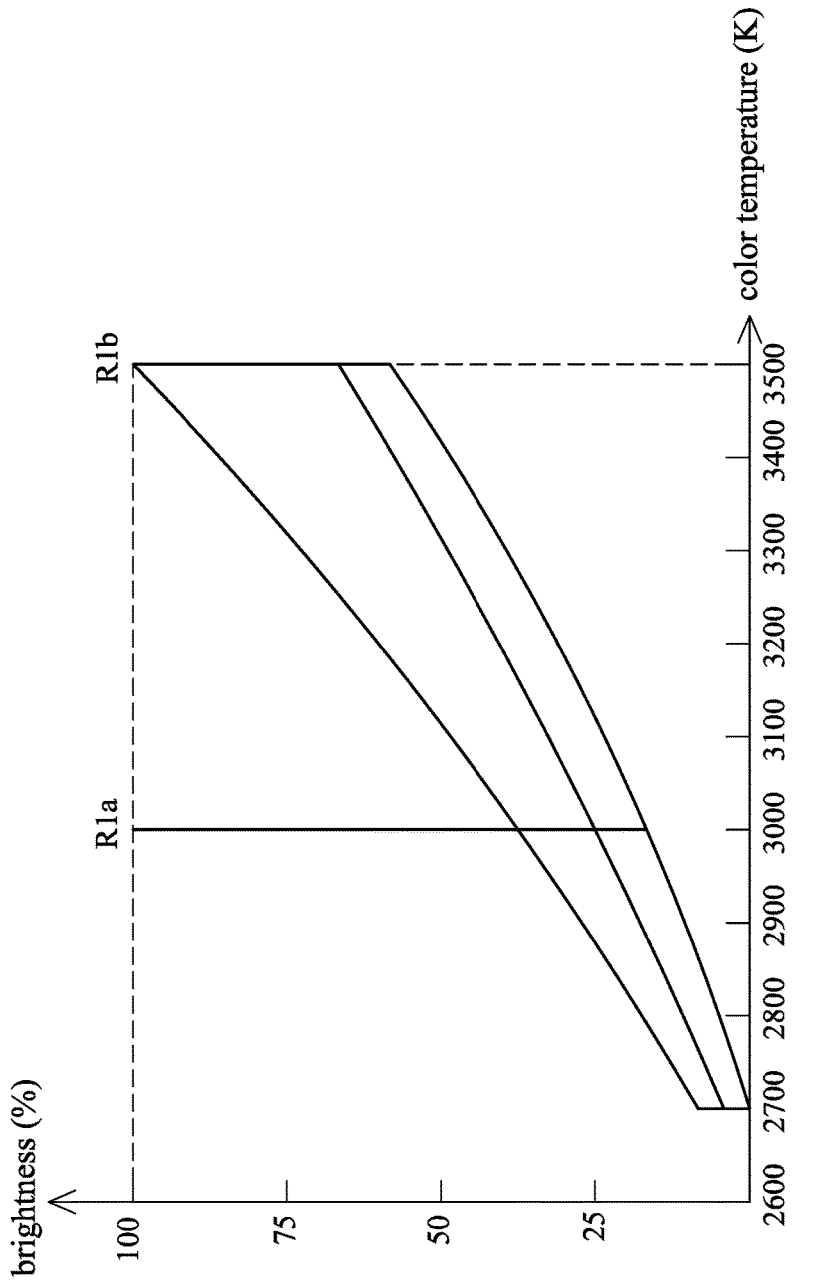
FIG. 3 is a schematic view illustrating the curve variation of the adjustable resistance R1 in accordance with the embodiment of the present invention.

Referring to FIG. 1 to FIG. 3, embodiments of the present invention provide a circuit structure for adjusting LED color temperature, comprising a power source 10, at least one first LED light set 30, at least one second LED light set 40, a current detection circuit 50, and a color temperature curve adjusting circuit 60.

The power source 10 is provided with a positive pole and a negative pole. The input end of the power source is connected with a light adjusting device 20 in series for adjusting the current output of the power source 10, wherein the power source 10 outputs a current I. In embodiments of the present invention, the power source 10 refers to a phase-cutting light adjusting power source; the light adjusting device 20 refers to a phase-cutting light adjusting device.

The at least one first LED light set 30 is provided with plural first LED lights 31 connected in series. A divided current I1 enters the first LED light set 30. In embodiments of the present invention, the first LED light set 30 is provided in one set, wherein the first LED lights 31 provide a warm white light.

The at least one second LED light set 40 is connected with the first LED light set 30 in parallel and provided with plural second LED lights 41 connected in series. Two terminals of the second LED light set 40 are provided with a voltage V2, respectively. A divided current I2 enters the second LED light set 40. The amount of the first LED lights 31 is identical to the amount of the second LED lights 41. In embodiments of the present invention, the second LED light set 40 is provided in one set, wherein the second LED lights 41 provide a cold white light.

The current detection circuit 50 is provided with a first variable resistance R1 and a first transistor Q1. One end of the first variable resistance R1 is connected with the positive pole of the power source 10 and the emitter of the first transistor Q1, while the other end of the first variable resistance R1 is connected with the base of the first transistor Q1 and the input ends of the first LED light set 30 and the second LED light set 40. In embodiments of the present invention, the first variable resistance R1 refers to a low-impedance variable resistance; the first transistor Q1 refers to a PNP type transistor.

The color temperature curve adjusting circuit 60 is provided with a resistance R2, a second variable resistance R3, and a second transistor Q2. One end of the resistance R2 is connected with the collector of the first transistor Q1, while the other end of the resistance R2 is connected with the base of the second transistor Q2 and one end of the second variable resistance R3. The other end of the second variable resistance R3 is connected with the negative pole of the power source 10, the collector of the second transistor Q2, and the output ends of the first LED light set 30 and the second LED light set 40. Further, the emitter of the second transistor Q2 is connected with the input end of one of the first LED lights 31, wherein the emitter of the second transistor Q2 is provided with a divided current I3. Also, a voltage V1 is provided between two terminals whereat the first LED lights 31 is connected with the input end of the first LED light set 30 and is connected with the emitter of the second transistor Q2. A voltage V3 is provided between the terminal of the first LED light 31 connected with the emitter of the second transistor Q2 and the output end of the first LED light set 30. The divided current is provided therebetween is defined as the current I4. In embodiments of the present invention, the second transistor Q2 refers to a PNP type transistor.

During the operation, the light adjusting device 20 adjusts the output current I of the power source 10. The output current I flows through the first LED light set 30 and the second LED light set 40, and generates a forward voltage Vbe1 of the first transistor Q1 on the first variable resistance R1 of the current detection circuit 50, such that the first transistor Q1 is conductive, achieving a function similar to a variable resistance and a switch. Also, at the middle point between the resistance R2 of the color temperature curve adjusting circuit 60 and the second variable resistance R3, a voltage varying according to the current flowing through the first LED light set 30 and the second LED light set 40 is generated, such that the second transistor Q2 is provided with a function similar to a variable resistance and a switch.

Furthermore, the second transistor Q2 functions as a forward voltage controlling switch of the first LED light set 30, and is gradually adjusted lower from a outputting and non-conductive status according to the adjustment of the light adjusting device 20, such that the forward voltage Vbe2 of the second transistor Q2 is gradually enlarged, the current I3 is increased, and the current I4 and the voltage V3 are decreased. Therefore, brightness of the first LED lights 31 of the first LED light set 30 is gradually lowered. Meanwhile, the voltage V1 plus the voltage V3 is smaller than the voltage V2. The second LED light set 40, according to the adjustment of the light adjusting device 20, gradually lowers the current output of the power source 10, and the brightness of the second LED light set 40 is gradually decreased. The current I2 is gradually decreased until being extinguished. At the meantime, only the first LED lights 31 with the current V1 remains, and the current I1 equals to the current I3, wherein the current is shut down according to the adjustment of the light adjusting device 20.

By use of the variation of the current flowing through the first LED light set 30 and the second LED light set 40, the current I1 plus the current I2 achieves a color temperature variation. The forward voltage Vbe2 of the second transistor Q2 is generated by the voltage division of the resistance R2 and the second variable resistance R3. When adjusting the voltage division of the resistance R2 and the second variable resistance R3, the forward voltage Vbe2 of the second transistor Q2 is changed to vary the current division of the current I3, such that the voltage V3 of the first LED light set 30 is lowered, and the voltage V1 plus voltage V3 is smaller than the voltage V2. Therefore, the two voltages are imbalance, and the current divisions are different. As a result, high color temperature and low color temperature are mixed, achieving a color temperature adjusting function, as shown by FIG. 2. Also, due to the voltage division of the resistance R2 and the second variable resistance R3, the second variable resistance R3 is able to be moderated, achieving a color temperature curve adjusting function.

In addition, through the moderation of the first variable resistance R1, as shown by FIG. 3, the peak of the color temperature variation is changed. Also, due to the second transistor Q2 functioning as a current division switch and the first LED lights 31 of the first LED light set 30 partially dimmed to extinguished by the current division of the second transistor Q2, the voltage V1 is smaller than the voltage V2. Therefore, the current I2 of the second LED light set 40 is gradually lowered to be extinguished. Only the first LED lights 31 with the voltage V1 remain bright, and the current thereof is adjusted to be shut down by the light adjusting device 20.

With the foregoing configuration, the light adjusting device 20 is used to control the current output of the power source 10. With the current detection circuit 50 and the color temperature curve adjusting circuit 60, the present invention is allowed to adjust the color temperature curve and change the peak of the color temperature, such that the color temperature is accurately adjusted. Also, the circuit of the present invention is relatively simple, thus lowering the loss of power and worthwhile used.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A circuit structure for adjusting LED color temperature curve, comprising:
   a power source provided with a positive pole and a negative pole;
   at least a first LED light set provided with plural first LED lights connected in series;
   at least a second LED light set connected with the first LED light set in parallel and provided with plural second LED lights connected in series;
   a current detection circuit provided with a first variable resistance and a first transistor, one end of the first variable resistance connected with the positive pole of the power source and an emitter of the first transistor, the other end of the first variable resistance connected with a base of the first transistor, an input end of the at least one first LED light set, and an input end of the at least one second LED light set; and
   a color temperature curve adjusting circuit gradually adjusting a LED color temperature responsive to a variation of current flow through the first LED light set and the second LED light set provided with a resistance, a second variable resistance, and a second transistor, one end of the resistance connected with a collector of the first transistor, the other end of the resistance connected with a base of the second transistor and one end of the second variable resistance, the other end of the second variable resistance connected with the negative pole of the power source, a collector of the second transistor, an output end of the at least one first LED light set, and an output end of the at least one second LED light set, wherein an emitter of the second transistor is connected with the input end of one of the first LED lights.

2. The circuit structure of claim 1, wherein the first variable resistance is a low-impedance variable resistance.

3. The circuit structure of claim 1, wherein the first transistor is a PNP type transistor.

4. The circuit structure of claim 1, wherein the second transistor is a PNP type transistor.

5. The circuit structure of claim 1, wherein the power source is a phase-cutting light adjusting power source.

6. The circuit structure of claim 1, wherein the amount of the first LED lights is identical to the amount of the second LED lights.

7. The circuit structure of claim 1, wherein the first LED lights provide a warm white light.

8. The circuit structure of claim 1, wherein the second LED lights provide a cold white light.

\* \* \* \* \*